(12) United States Patent
Vashi et al.

(10) Patent No.: US 7,418,679 B1
(45) Date of Patent: Aug. 26, 2008

(54) METHOD OF ENABLING TIMING VERIFICATION OF A CIRCUIT DESIGN

(75) Inventors: Mehul R. Vashi, San Jose, CA (US); Alex S. Warshofsky, Santa Clara, CA (US)

(73) Assignee: Xilinx, Inc., San Jose, CA (US)

( * ) Notice: Subject to any disclaimer, the term of this patent is extended or adjusted under 35 U.S.C. 154(b) by 259 days.

(21) Appl. No.: 11/072,898

(22) Filed: Mar. 4, 2005

(51) Int. Cl.
*G06F 17/50* (2006.01)

(52) U.S. Cl. .............................................. 716/5; 716/6
(58) Field of Classification Search .................. 716/5–6
See application file for complete search history.

(56) References Cited

U.S. PATENT DOCUMENTS 6,857,110 B1 * 2/2005 Rupp et al. ..................... 716/4
6,925,621 B2 * 8/2005 Mielke et al. ................... 716/6

\* cited by examiner

*Primary Examiner*—Stacy A Whitmore
(74) *Attorney, Agent, or Firm*—John J. King

(57) ABSTRACT

The various embodiments of the present invention relate to circuit verification. According to one embodiment of the invention, a method of enabling timing verification of a circuit design comprises steps of generating a timing model of a processor core for a static timing analysis tool; coupling timing data related to the processor core to the static timing analysis tool; extracting resistance and capacitance data for interconnect circuits of the circuit design; coupling the resistance and capacitance data for the interconnect circuits to the static timing analysis tool; and verifying the performance of the circuit design using the static timing analysis tool. According to another embodiment of the invention, a system for enabling timing verification of a circuit design is described.

20 Claims, 4 Drawing Sheets

METHOD OF ENABLING TIMING VERIFICATION OF A CIRCUIT DESIGN

FIELD OF THE INVENTION

The present invention is related to circuit verification, and in particular, to a method of enabling timing verification of a circuit design.

BACKGROUND OF THE INVENTION

As process geometries continue to decrease and clock frequencies continue to increase, signal integrity is becoming a more significant issue for designers. It is essential for designers to address signal integrity and performance issues to ensure that their designs are functioning properly, while providing their designs to their customers in the shortest amount of time. One essential task to ensure signal integrity and performance is to provide static timing analysis, which is a point-to-point delay analysis of a design network with respect to a given set of constraints. The placement and routing of a circuit design is executed according to timing constraints that are specified in the design process. Timing analysis software then interacts with the placement and routing of the circuit to ensure that the timing constraints imposed on the design are met.

However, it is generally difficult to analyze performance of different design blocks that exist as a part of a processor block which is embedded in a programmable logic device (PLD), such as a field programmable gate array (FPGA). While standard static timing analysis tools are fast and accurate, they are generally unable to accommodate custom or semi-custom circuit blocks. That is, static timing analysis tools are primarily developed to support a pre-determined design flow. These tools also have difficulty in accommodating very large IP blocks such as a processor core. Also, formats provided by vendors may not be compatible with the requirements of the tool.

Further, each design group for the various design blocks may have a different design technique. For example, interconnect tiles surrounding a processor block are designed using custom circuit design flow and are typically verified using a circuit simulation program, such as a Simulation Program with Integrated Circuit Emphasis (SPICE). In contrast, the processor core, such as a PowerPC processor core available from IBM Corporation, is verified by the provider of the processor core. PLDs may also use a number of these predefined functions, or functional blocks, that will need to interact with the configurable logic. The interface I/O timing data for the various functional blocks is provided in a textual format by the IP provider. Because all of these blocks are interconnected together, there is a need to analyze the timing and verify the performance of the various blocks in aggregate.

Conventional methods of verifying the timing performance of the various blocks in aggregate include first individually gathering I/O timing of all of these blocks. Then, the interconnects between each block are simulated using a circuit simulator, such as SPICE. Finally, all of these timing delay numbers are added together in a spreadsheet format. In addition to being cumbersome, such conventional processes employing spreadsheets are not very accurate. Because the timing numbers are required to be calculated for a number of process/voltage/temperature (PVT) conditions, the number of combinations becomes excessive. Also, the time that is required to run SPICE simulations accurately on tens of thousands of interconnect wires is very large. Finally, after every minor design change, it takes a significant amount of time to re-verify the performance of the entire design block. For example, every iteration of a performance verification step could take one or two weeks to complete.

Accordingly, there is a need for a more efficient method of enabling timing verification.

SUMMARY OF THE INVENTION

The various embodiments of the present invention relate to circuit verification. According to one embodiment of the invention, a method of enabling timing verification of a circuit design comprises steps of generating a timing model of a processor core for a static timing analysis tool; coupling timing data related to the processor core to the static timing analysis tool; extracting resistance and capacitance data for interconnect circuits of the circuit design; coupling the resistance and capacitance data for the interconnect circuits to the static timing analysis tool; and verifying the performance of the circuit design using the static timing analysis tool.

According to another embodiment of the invention, a system for enabling timing verification of a circuit design comprises a data extraction tool coupled to receive data related to interconnect lines of an integrated circuit. The data extraction tool outputs interconnect parasitic data and hardware description data related to circuits of the integrated circuit. A circuit simulator is also coupled to receive delay data for interconnect tiles for a processor block of the integrated circuit. The circuit simulator enables scripts to be written representing the interconnect tiles for the processor block. Finally, a static timing analysis tool is coupled to receive the interconnect parasitic data and hardware description data related to the interconnect lines and the scripts representing the interconnect tiles from the circuit simulator.

DETAILED DESCRIPTION OF THE DRAWINGS

Figure 1:
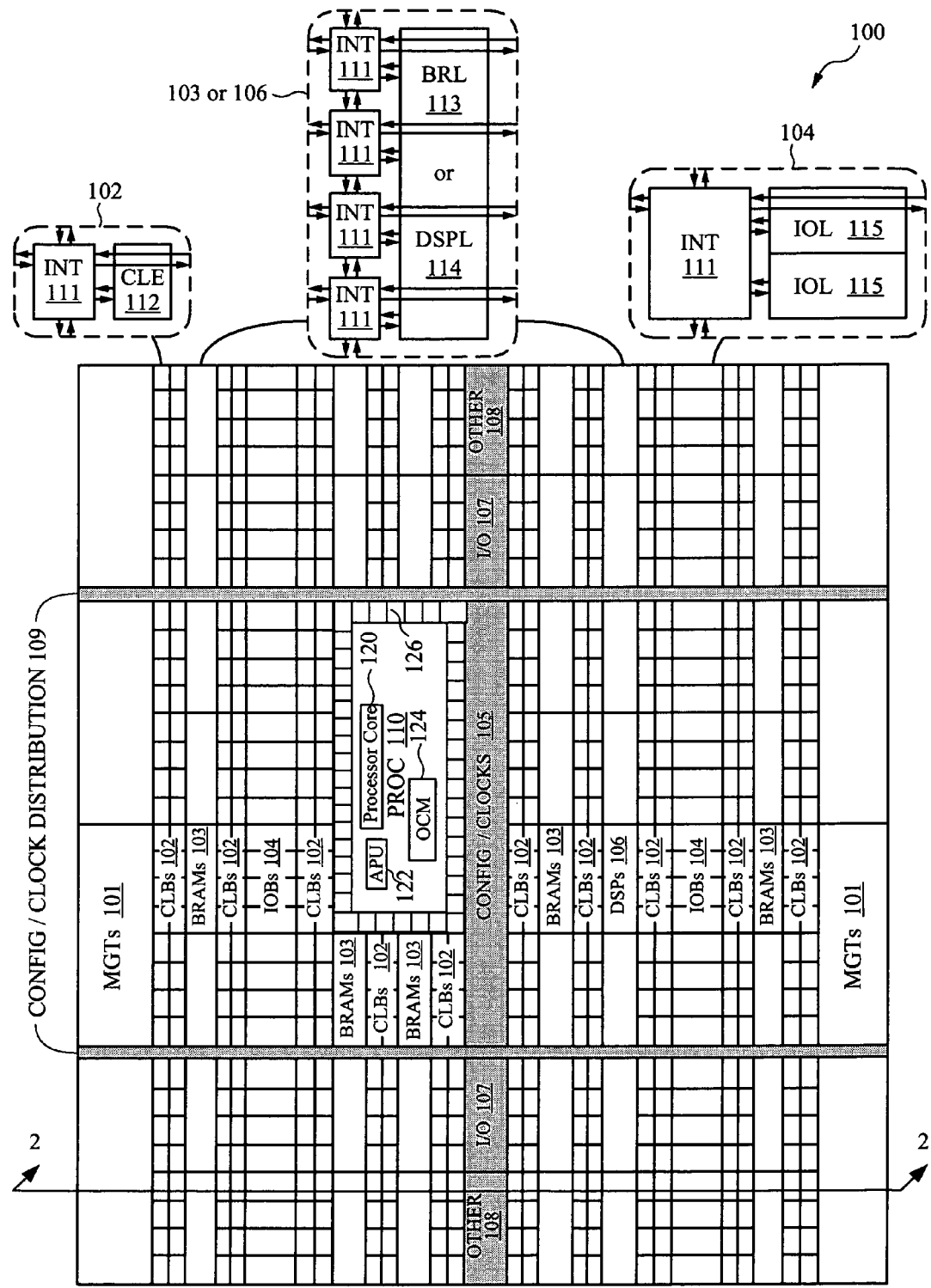
FIG. 1 is a block diagram of a circuit having a number of blocks requiring timing verification according to an embodiment of the present invention.

Turning first to FIG. 1, a block diagram of a circuit having a number of blocks requiring timing verification according to an embodiment of the present invention is shown. In particular, advanced FPGAs can include several different types of programmable logic blocks in the array. For example, FIG. 1 illustrates an FPGA architecture 100 that includes a large number of different programmable tiles including multi-gigabit transceivers (MGTs 101), configurable logic blocks (CLBs 102), random access memory blocks (BRAMs 103), input/output blocks (IOBs 104), configuration and clocking logic (CONFIG/CLOCKS 105), digital signal processing blocks (DSPs 106), specialized input/output blocks (I/O 107) (e.g., configuration ports and clock ports), and other programmable logic 108 such as digital clock managers, analog-to-digital converters, system monitoring logic, and so forth. Finally, configuration and clock distribution rows 109 provide various signals including clock signals across the various columns.

According to one aspect of the present invention, FPGA 100 includes one or more dedicated processor blocks (PROC 110) comprising a processor core 120, an auxiliary processing unit (APU) controller 122, an on-chip memory controller 124, and a plurality of interconnect tiles 126. Each programmable tile, including the interconnect tiles 126, could include a programmable interconnect element (INT 111) having standardized connections to and from a corresponding interconnect element in each adjacent tile. Therefore, the programmable interconnect elements taken together implement the programmable interconnect structure for the illustrated FPGA. The programmable interconnect element (INT 111) could also include the connections to and from the programmable logic element within the same tile, as shown by the examples included at the top of FIG. 1. For example, a CLB 102 can include a configurable logic element (CLE 112) that can be programmed to implement user logic plus a single programmable interconnect element (INT 111). A BRAM 103 can include a BRAM logic element (BRL 113) in addition to one or more programmable interconnect elements. Typically, the number of interconnect elements included in a tile depends on the height of the tile. In the pictured embodiment, a BRAM tile has the same height as four CLBs, but other numbers (e.g., five) can also be used. A DSP tile 106 can include a DSP logic element (DSPL 114) in addition to an appropriate number of programmable interconnect elements. An IOB 104 can include, for example, two instances of an input/output logic element (IOL 115) in addition to one instance of the programmable interconnect element (INT 111). The programmable interconnect elements could be implemented using a plurality of metal layers coupling the circuit elements formed in the substrate. For example, the first 5 layers could comprise conductors used for connecting circuit elements within a functional block, such as BRAM or CLB of a programmable logic device, while the interconnect circuits comprising conductors between the functional blocks could be positioned on the upper six layers. Even layers of the interconnect layers could be used to route signals in a longitudinal direction, while odd layers could be used to route signals in a lateral direction. As will be clear to those of skill in the art, the actual I/O pads connected, for example, to the I/O logic element 115 are manufactured using metal layered above the various illustrated logic blocks, and typically are not confined to the area of the input/output logic element 115.

In the pictured embodiment, a columnar area near the center of the die (shown shaded in FIG. 1) is used for configuration, clock, and other control logic. Horizontal areas 109 extending from this column are used to distribute the clocks and configuration signals across the breadth of the FPGA. Some FPGAs utilizing the architecture illustrated in FIG. 1 include additional logic blocks that disrupt the regular columnar structure making up a large part of the FPGA. The additional logic blocks can be programmable blocks and/or dedicated logic. For example, the processor block PROC 110 shown in FIG. 1 spans several columns of CLBs and BRAMs.

Note that FIG. 1 is intended to illustrate only an exemplary FPGA architecture. The numbers of logic blocks in a column, the relative widths of the columns, the number and order of columns, the types of logic blocks included in the columns, the relative sizes of the logic blocks, and the interconnect/logic implementations included at the top of FIG. 1 are purely exemplary. For example, in an actual FPGA more than one adjacent column of CLBs is typically included wherever the CLBs appear, to facilitate the efficient implementation of user logic. Similarly the circuits and methods of the present invention could be implemented in any device, including any type of programmable logic device, having memory.

Figure 2:
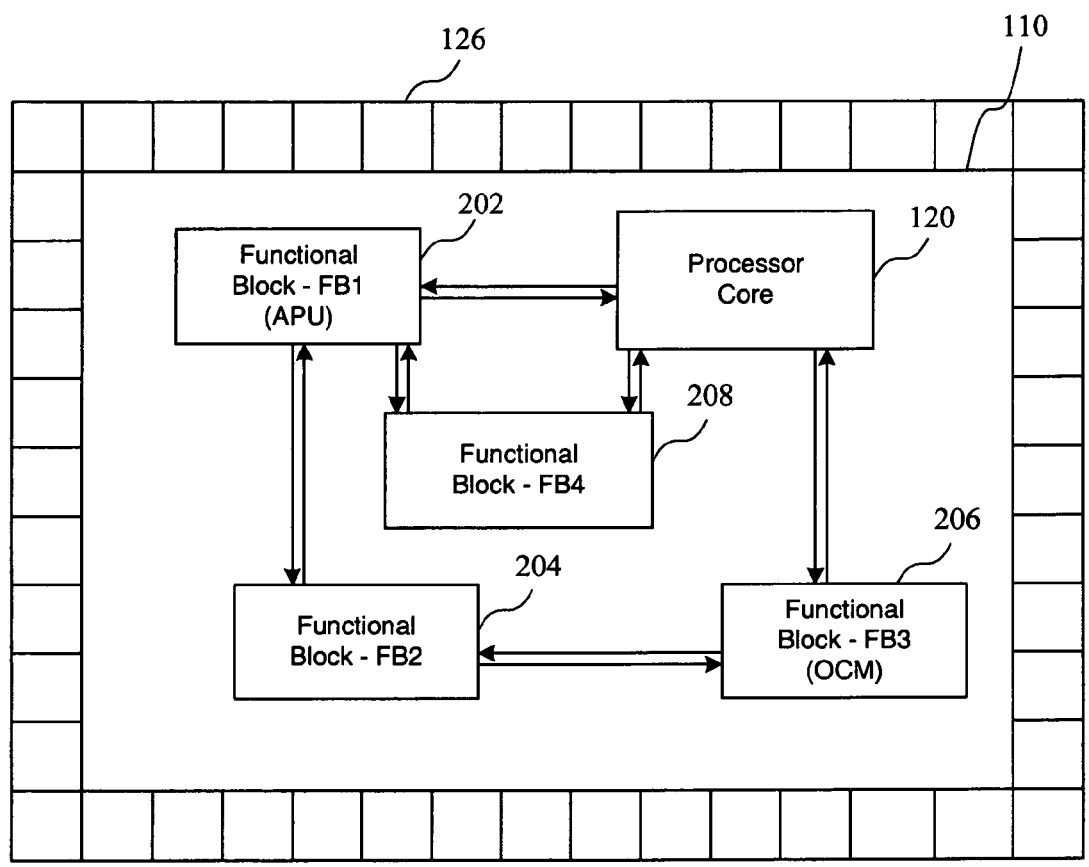
FIG. 2 is a block diagram of circuit blocks requiring timing verification according to an embodiment of the present invention.

As shown in FIG. 2, an example of various circuit blocks which affect the timing verification of a circuit is shown. The set of IPs of processor block 110 could include a processor core 120, internally developed standard cell based design blocks (e.g. Ethernet MAC, on-chip memory controllers, an Auxiliary Processing Unit (APU) controller as well as test and control logic) and also interconnect tiles 126 that surround the processor block 110. Because each of these blocks comprises different timing elements represented in different data formats, it is difficult to determine the aggregate timing performance of a circuit. In particular, a processor core 120 is coupled to one or more of a plurality of functional blocks, some of which are also coupled to one another. For example, Functional Block FB1 202 comprising an APU is coupled to processor core 120, as well as Functional Block FB2 204 and Functional Block FB3 206 (which could comprise an on-chip memory (OCM) controller). Finally, functional block FB4 208 is coupled to the functional block FB1 and the processor core 120. Timing data associated with each of these functional blocks, as well as interface tiles surrounding the processor block, is required to determine the aggregate timing analysis of the circuit.

Figure 3:
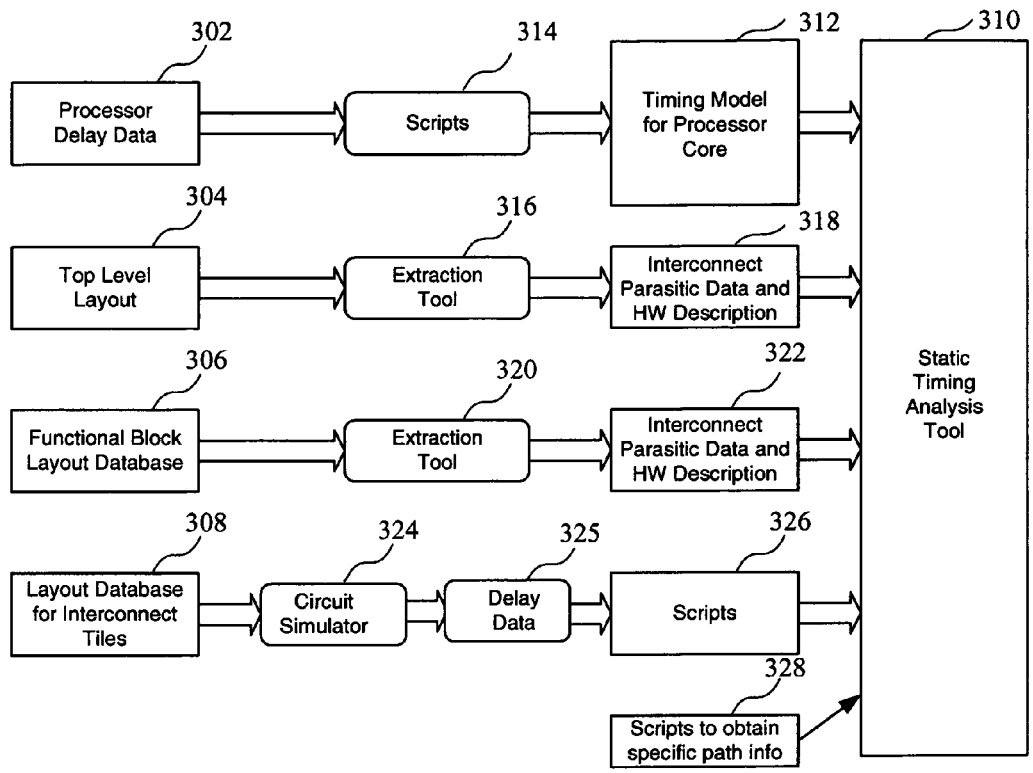
FIG. 3 is a block diagram showing the flow of data enabling timing verification according to an embodiment of the present invention.

Referring now to FIG. 3, a block diagram shows the flow of data enabling timing verification according to an embodiment of the present invention. The timing verification flow is implemented by combining various elements of the top level design, IPs and interconnects. In particular, various input data, including processor delay data 302, top level layout data 304 (representing timing data for interconnects between functional blocks), a functional block layout database 306 (representing timing data for interconnects between gates of individual functional blocks), and a layout database for interconnect tiles 308 (representing delays from the processor block to the programmable logic device), are used by a static timing analysis tool 310 to determine aggregate timing analysis data. An example of a static timing analysis tool is PrimeTime software from Synopsys, Inc. Mountain View, Calif. However, unlike conventional systems for analyzing timing data, the method of the present invention selectively provides the timing analysis tool with information to determine a total delay time for the circuit. That is, unlike conventional systems for determining a delay time for a circuit by adding various interconnect delays to delays for functional blocks calculated by a static timing analysis tool, the methods of the present invention enable a single static timing analysis tool to determine an aggregate timing analysis for the circuit.

Accordingly to one aspect of the invention, a black box timing model 312 of the processor core is created using scripts 314. The output of the scripts preferably contains all of the I/O timing information on all the pins of the processor core. This information preferably provides a simple format for reading setup/hold numbers on all inputs and clock-to-out numbers on all outputs of the processor core by the static timing analysis tool 310. Additionally, black box models of the processor core are preferably created for each corner of the PVT conditions. Any updates to the I/O timing of the processor core are converted to the block-box timing model within minutes using scripts 314. Scripts 314 could be, for example, a Practical Extraction and Report (PERL) script that translates data into a format acceptable to the static timing analysis tool 310.

The interconnect timing data between various functional blocks are extracted from top level data 304 after place and route by an extraction tool 316. Such timing data could be extracted using conventional extraction tools in order to generate a parasitic format file and hardware description 318 which is used by the static timing analysis tool. For example, a Detailed Specific Parasitic Format (DSPF) file for the interconnect parasitic data and a Verilog file for the hardware description could be generated. The timing of functional blocks which are designed using standard cell based flow is also extracted using conventional extraction tools. That is, the functional block layout database 306 is coupled to an extraction tool 320 to also generate a parasitic format file and hardware description 322. Examples of extraction software could include Arcadia software from Synopsys, Inc. of Mountain View, Calif., or Assura software from Cadence Design Systems, Inc. of San Jose, Calif. The results of the extraction are fed into the static timing analysis tool.

The interconnect tiles, which are designed using custom circuit design flow, are characterized using a circuit simulator 324 such as SPICE to determine their I/O performance. Delay data 325 generated by SPICE is then provided to the static timing analysis tool in the form of driving characteristics of output drivers as well as input load data of the input drivers, at all of the PVT corners. Finally, multiple scripts 328 are developed to read in all of the above data in a contiguous fashion. Additionally, timing constraints are supplied to these scripts so that the results can be analyzed against these timing constraints at the top level. Performance analysis information corresponding to the input data can be reported by the static timing analysis tool within minutes.

One advantage of the embodiments of the present invention is that it saves considerable compute time. It also allows the developers of individual functional blocks to analyze timing independently and focus on those functional blocks. Further, there is no need to use tables for producing aggregate timing data. If models change, any of the models can easily be reproduced. New timing data can be generated by merely adjusting the scripts to obtain new models. Further, the timing information based upon actual wire lengths is more precise then conventional method because there is no granularity on wire lengths. Also, actual resistor and capacitor values are used. No estimation is required, and there is reduced human error transcribing data from one table to another. Accordingly, all load information is taken into account. Finally, the circuits and methods of the present invention verify the performance of a heterogeneous set of IPs embedded in a programmable logic device.

Figure 4:
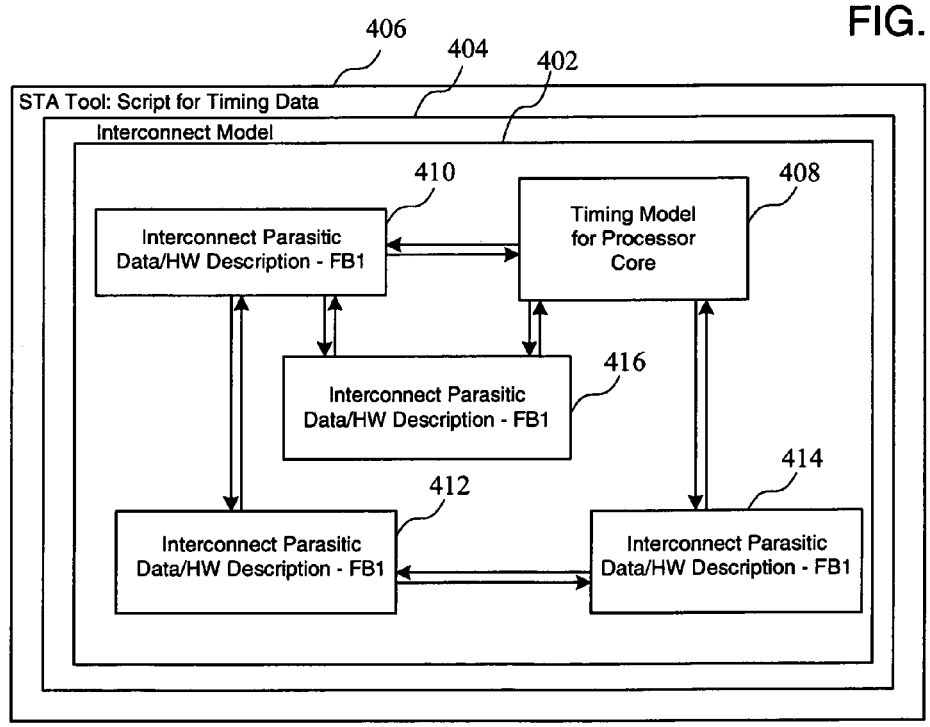
FIG. 4 is a block diagram showing levels of data for enabling timing verification according to an embodiment of the present invention.

Turning now to FIG. 4, a block diagram shows levels of data for enabling timing verification according to an embodiment of the present invention. In particular, interconnect data 402 representing interconnect data between the various functional blocks comprises a first level of timing data. An interconnect model 404 representing interconnect tiles of the processor block provides a second level of timing information. Finally, scripts for timing data 406 comprise a third level of timing data. The interconnect data for the various functional blocks could include a timing model for the processor core 408, as well as the various interconnect parasitic data/hardware description for the various functional blocks 410-416. That is, the interconnect data for the various functional blocks 408-416 provides timing data for interconnect lines between gates of individual functional blocks.

Figure 5:
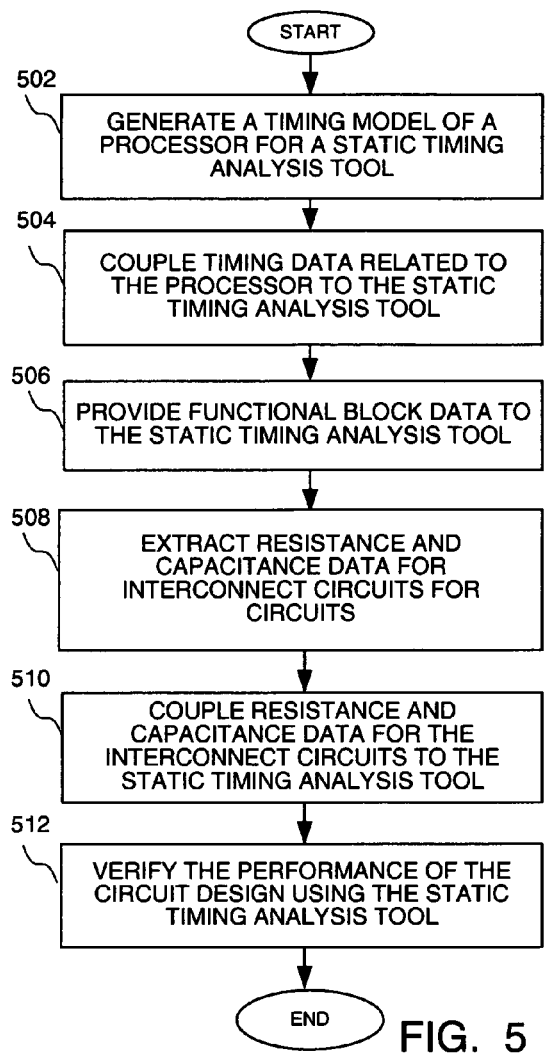
FIG. 5 is a flow chart showing a method of enabling timing verification of a circuit design according to an embodiment of the present invention.

Turning now to FIG. 5, a flow chart shows a method of enabling timing verification of a circuit design according to an embodiment of the present invention. A timing model of a processor core is generated for a static timing analysis tool at a step 502. Timing data related to the processor core is coupled to the static timing analysis tool at a step 504. Functional block data is provided at a step 506. Resistance and capacitance data for interconnect circuits for circuits defined by the functional blocks is extracted at a step 508. The resistance and capacitance data for the interconnect circuits is coupled to the static timing analysis took at a step 510. The performance of the circuit design is then verified using the static timing analysis tool at a step 512. The method of FIG. 5, as well as the method of FIG. 6 described below, could be implemented according to the block diagram of FIG. 3, for example, or based upon some other flow of data.

Figure 6:
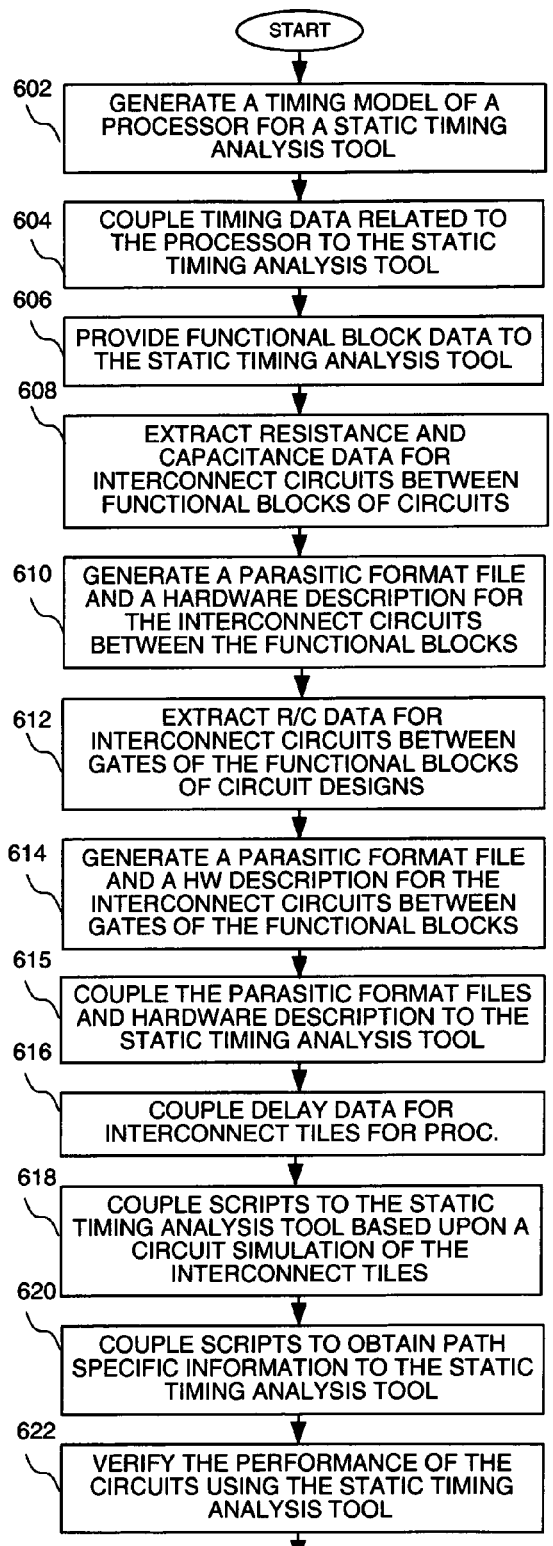
FIG. 6 is a flow chart showing a method of enabling timing verification of a circuit design according to an alternate embodiment the present invention.

Turning now to FIG. 6, a flow chart shows a method of enabling timing verification of a circuit design according to an alternate embodiment the present invention. A timing model of a processor core for a static timing analysis tool is generated at a step 602. Timing data related to the processor core is coupled to the static timing analysis tool at a step 604. For example, scripts (such as PERL scripts) for the delay data provided by the supplier of the processor core could be generated to translate the data into a format acceptable to the static timing analysis tool. Functional block data is provided at a step 606. Resistance and capacitance data for interconnect circuits between functional blocks of circuits is extracted at a step 608. A parasitic format file and a hardware description for the interconnect circuits between the functional blocks is generated at a step 610. Resistance and capacitance data for interconnect circuits between gates of the functional blocks of circuit designs are also extracted at a step 612. A parasitic format file and a hardware description for the interconnect circuits between gates of the functional blocks is generated at a step 614, and coupled to the static timing analysis tool at a step 615. Delay data for interconnect tiles for a processor block of a programmable logic device is provided at a step 616. Scripts are coupled to the static timing analysis tool based upon a circuit simulation of the interconnect tiles at a step 618. Finally, scripts to obtain path specific information are coupled to the static timing analysis tool at a step 620, and the performance of the circuits is then verified using the static timing analysis tool at a step 622.

It can therefore be appreciated that the new and novel method of enabling timing verification of a circuit design has been described. It will be appreciated by those skilled in the art that numerous alternatives and equivalents will be seen to exist which incorporate the disclosed invention. As a result, the invention is not to be limited by the foregoing embodiments, but only by the following claims.

The invention claimed is:

1. A method of enabling timing verification of a circuit design implemented in a device having programmable logic and a dedicated processor, said method comprising the steps of:

receiving input/output timing information for all input/outputs of a processor core of said dedicated processor over various operating conditions;

generating a timing model of said processor core of said dedicated processor of said device for a static timing analysis tool, wherein said timing model for said processor core is based upon data from a provider of said processor core in a first data format;

generating timing data for a functional block of said dedicated processor of said device for said static timing analysis tool, wherein said timing data for said functional block is based upon data from a provider of said functional block in a second data format which is different than said first data format;

coupling timing data related to said processor core and said timing data for said functional block of said dedicated processor to said static timing analysis tool;

extracting resistance and capacitance data for programmable interconnect elements of interconnect circuits associated with functional blocks of said circuit design implemented in said device;

coupling said resistance and capacitance data for said programmable interconnect elements of interconnect circuits to said static timing analysis tool; and verifying the performance of said circuit design and said processor core over said various operating conditions using said static timing analysis tool.

2. The method of claim 1 further comprising a step of coupling scripts that translate timing data related to said processor core to said static timing analysis tool.

3. The method of claim 1 further comprising a step of generating a parasitic format file and a hardware description based upon said resistance and capacitance data in a format readable by said static timing analysis tool.

4. The method of claim 1 further comprising a step of generating scripts based upon delay data for interconnect tiles for said dedicated processor of a programmable logic device.

5. The method of claim 1 further comprising a step of coupling scripts for obtaining specific path information to said static timing analysis tool.

6. The method of claim 1 wherein said step of extracting resistance and capacitance data for interconnect circuits of said circuit design comprises a step of extracting resistance and capacitance data for interconnect circuits between functional blocks of said circuit design.

7. The method of claim 1 wherein said step of extracting resistance and capacitance data for interconnect circuits for circuits of said circuit design comprises a step of extracting resistance and capacitance data for interconnect circuits between gates of said functional blocks of said circuit design.

8. The method of claim 1 further comprising a step of receiving delay data for interconnect tiles for said processor core.

9. The method of claim 8 further comprising a step of coupling scripts based upon a circuit simulation of said interconnect tiles to said static timing analysis tool.

10. The method of claim 1 further comprising a step of providing data for implementing functional blocks in a programmable logic device.

11. A method of enabling timing verification of a circuit design implemented in a device having programmable logic and a dedicated processor, said method comprising the steps of:

receiving input/output timing information for all input/outputs of a processor core of said dedicated processor over various operating conditions;

generating a timing model of said processor core of said dedicated processor of said device for a static timing analysis tool, wherein said timing model for said processor core is based upon data from a provider of said processor core in a first data format;

generating timing data for a functional block of said dedicated processor of said device for said static timing analysis tool, wherein said timing data for said functional block is based upon data from a provider of said functional block in a second data format which is different than said first data format;

coupling timing data related to said processor core and said timing data for said functional block of said dedicated processor to said static timing analysis tool;

providing timing data for functional blocks of said circuit design;

extracting resistance and capacitance data for programmable interconnect elements of interconnect circuits between said functional blocks of circuits of said circuit design implemented in said device;

generating a parasitic format file and a hardware description for said programmable interconnect elements of interconnect circuits between said functional blocks;

extracting resistance and capacitance data for programmable interconnect elements of interconnect circuits between gates of said functional blocks of said circuit design;

generating a parasitic format file and a hardware description for said programmable interconnect elements of interconnect circuits between gates of said functional blocks;

coupling said parasitic format files and said hardware descriptions to said static timing analysis tool; and verifying the performance of said circuits and said processor core over said various operating conditions using said static timing analysis tool.

12. The method of claim 11 wherein said step of providing timing data for functional blocks comprises a step of coupling timing data for a plurality of functional blocks to said static timing analysis tool.

13. The method of claim 11 further comprising a step of coupling delay data for interconnect tiles for said dedicated processor of said device.

14. The method of claim 13 further comprising a step of coupling scripts to said static timing analysis tool based upon a circuit simulation of said interconnect tiles.

15. The method of claim 11 further comprising a step of coupling scripts to obtain path specific information to said static timing analysis tool.

16. A system for enabling timing verification of a circuit design, said system comprising:

a device comprising a circuit implemented in programmable logic and a dedicated processor comprising a processor core and function blocks performing other functions of said dedicated processor;

a data extraction tool coupled to receive data related to programmable interconnect lines of interconnect tiles associated with functional blocks of said dedicated processor, said data extraction tool outputting interconnect parasitic data and hardware description data related to circuits of a functional block of said processor block based upon data in a first data format from said provider of said functional block;

a circuit simulator coupled to receive delay data for interconnect tiles for said dedicated processor of said device, said circuit simulator enabling scripts to be written representing said interconnect tiles for said dedicated processor; and a static timing analysis tool coupled to receive said interconnect parasitic data and hardware description data related to said functional block of said dedicated processor, said scripts representing said interconnect tiles from said circuit simulator, and data from a timing model for said processor core of said dedicated processor, said timing model for said processor core based upon input/output timing information for all input/outputs of said processor core over various operating conditions, said input/output timing information being provided from a provider of said processor core in a second data format which is different than said first data format.

17. The system of claim 16 wherein said interconnect parasitic data and hardware description data comprise data for interconnects between functional blocks of said device.

18. The system of claim 16 wherein said interconnect parasitic data and hardware description data comprise data for interconnects for gates of said functional blocks.

19. The system of claim 16 further comprising scripts for obtaining specific path information coupled to said static timing analysis tool.

20. The system of claim 16 wherein said device comprises a programmable logic device.

* * * * *